(12) United States Patent
Rossi

(10) Patent No.: US 9,283,979 B1
(45) Date of Patent: Mar. 15, 2016

(54) FLEXIBLE HANDLE STROLLER LIGHT

(71) Applicant: Jennifer Amy Eunice Rossi, Surrey (CA)

(72) Inventor: Jennifer Amy Eunice Rossi, Surrey (CA)

( * ) Notice: Subject to any disclaimer, the term of this patent is extended or adjusted under 35 U.S.C. 154(b) by 0 days.

(21) Appl. No.: 14/499,123

(22) Filed: Sep. 27, 2014

(51) Int. Cl.
| | |
|---|---|
| *F21S 4/00* | (2006.01) |
| *F21V 21/00* | (2006.01) |
| *F21S 8/10* | (2006.01) |
| *B62B 9/00* | (2006.01) |
| *F21W 101/02* | (2006.01) |

(52) U.S. Cl.
CPC .............. *B62B 9/005* (2013.01); *F21S 48/215* (2013.01); *F21W 2101/02* (2013.01)

(58) Field of Classification Search
CPC .... B62B 9/005; F21S 48/215; F21W 2101/02
See application file for complete search history.

(56) References Cited

U.S. PATENT DOCUMENTS

| | | | |
|---|---|---|---|
| 6,394,633 B1 * | 5/2002 | Perez | 362/459 |
| 8,025,433 B2 | 9/2011 | Comrada | |
| 8,215,808 B2 | 7/2012 | Daley et al. | |
| 8,356,824 B1 | 1/2013 | Manweiler et al. | |
| 2009/0244916 A1 | 10/2009 | Conwell et al. | |
| 2012/0300439 A1 * | 11/2012 | Davis Hatfield et al. | 362/183 |
| 2014/0226358 A1 * | 8/2014 | Nielson | 362/543 |

* cited by examiner

*Primary Examiner* — Donald Raleigh
(74) *Attorney, Agent, or Firm* — John D. Gugliotta

(57) ABSTRACT

An element for providing bright, directed illumination is provided having a housing that can be attached to the handle of a child's stroller, thereby increasing visibility when walking at night. A small and compact housing contains a plurality of LED lights to allow others to see the child's stroller from a great distance away. Attached at the back of the head is an elasticized circular band that attaches to a push handle by wrapping tightly around and locking in place by engaging with impingement structures formed on the housing.

17 Claims, 3 Drawing Sheets

FLEXIBLE HANDLE STROLLER LIGHT

RELATED APPLICATIONS

The present invention claims benefit of U.S. Provisional Application 61/919,660 filed on Dec. 20, 2013 and incorporated by references as if fully rewritten herein. There are no previously filed, nor currently any co-pending applications, anywhere in the world.

BACKGROUND OF THE INVENTION

1. Field of the Invention

The inventive device disclosed in the present application generally relates to portable LED lighting and, more specifically, to a portable LED lighting assembly adapted for attachment to a child's stroller such as to allow both the child and the parent will be highly visible within their surroundings at night.

2. Description of the Related Art

Infant carriages or strollers have been around since the early eighteens century as a means for carrying and transporting small children. These wheeled devices are generally divided into 'baby carriages' (North American English) or 'Prams/carrycots' (British English) which are used for newborn babies in which the infant normally lies down facing the pusher and 'strollers' (North American English) or 'Push chairs/buggies' (British English), which are used for the small child up to about three years old in a sitting position facing forward. In the United States, "stroller" refers to the open, folding transport, whereas "buggy" refers to the larger, covered transport.

Since the 1980s, the stroller industry has developed with new features, safer construction and more accessories. However, when one desires to use such devices at night or in low visibility conditions, choices of commercially available safety equipment are limited to the use of a general purpose flashlight or other lighting devices designed for other activities such as jogging or fishing.

Some methods and devices are known that incorporate various LED lighting mechanisms are known. For example:

LED lights are well known in the art. For example, U.S. Published Patent Application No. 20120300439 by Davis and Tena discloses lighting systems for strollers enabling the users to integrate straight forward and modular lighting elements with eco-friendly practices to produce helpful and useful products whose functionality dictates safety levels consistent with statutory schemes for other wheeled vehicles, assuring visibility to both pedestrians and other Street traffic.

In addition to that, U.S. Pat. No. 8,025,433 to Comrada discloses and claims a stroller light that can be easily attached to any standard baby stroller. The stroller light described in the Comrada patent is comprised of a hollow housing that holds a battery pack, electric circuit, and on-off switch. A plurality of LEDs are mounted through apertures on the front and sides of the housing and can sequentially turn on and off. A hollow flag pole can be attached to the housing and wires run from the housing, through the flag pole interior to an electroluminescent wire that is sewn onto the perimeter of the flag and to an amiable light that can be used to help navigate during the evening hours.

U.S. Pat. No. 8,215,808 to Daley and Thorne also discloses and claims a lighting system for a stroller including: a power generation system coupled to at least one wheel of the stroller; a power source operationally coupled to the power generation system and configured to receive and store power generated by the power generation system. under the teaching of the Daley and Throne patent at least one first light source coupled to at least one leg of the stroller and configured to be powered by the power source; and at least one second light source coupled to a central hub of the stroller and configured to be powered by the power source.

U.S. Pat. No. 8,356,824 to Manweiler and Coon discloses a stroller illumination system that includes a stroller frame and a child receiving member that is mounted on the stroller frame. The Manweiler and Coon stroller frame includes a plurality of legs and a handle grip. Each of the legs has at least one of a plurality of wheels rotatably coupled thereto. A light emitting assembly is mounted on the frame. The light emitting assembly emits light when turned on to increase a visibility of the stroller frame.

Finally, U.S. Published Patent Application No. 20090244916 to Conwell and Conwell discloses a safety light having an easily recognizable and illumination pattern. The safety light consists of a housing containing at least one group of secondary lighting elements arranged substantially around a primary lighting element. The lighting elements are covered by a translucent face having a central portion overlying the primary lighting element. Circuit means power the lighting elements such that the secondary lighting elements are illuminated in a rotating, flickering or pulsing sequence producing a distinct light pattern. The safety light is suitable for use in a wide variety of applications, including vehicles and recreational and service activities.

Despite all the efforts listed above prior art patents describe structures that are either not truly convenient or else involve complicated, expensive, and overly difficult assembly and/or disassembly parts and procedures. Consequently, a need has been felt for providing an safety lighting apparatus that can be quickly, easily and repeatedly attached to a pushing handle of a stroller or like device that provides bright, directed illumination of both the path ahead and to detect the user themself.

SUMMARY OF THE INVENTION

It is thus an object of the present invention to provide safety feature, which can save lives of children when they are riding in strollers at night.

It is another objective of the present invention to eliminate the worry of parents about not being visible when walking on streets with their children at night.

It is a further objective of the present invention to provide a device that does not rusts or deteriorate over time and that can be safely installed over a baby stroller without attracting noxious bugs and blood sucking ticks.

Briefly described according to a preferred embodiment of the present invention, a portable LED lighting assembly is provided that is a adapted for repeated attachment to and detachment from a child's stroller such as to allow both the child and the parent will be highly visible within their surroundings at night. The lighting assembly includes a set of three bright LED lights so both the child and the parent will be highly visible and much safer when walking at night or in low visibility environments.

Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
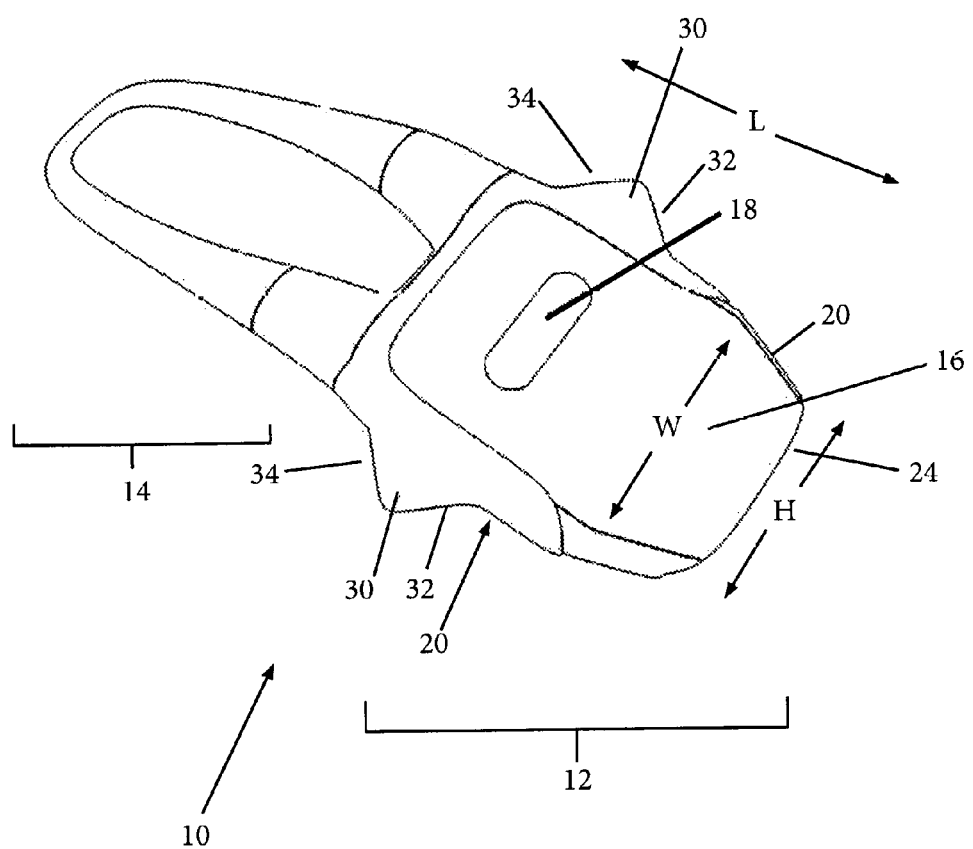
FIG. 1 is an upper perspective view of quick attach child's stroller lighting apparatus in accordance with a preferred embodiment of the present invention.

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Referring now to the figures, wherein like reference numerals indicate the same parts throughout the several views, a quick attach child's stroller lighting apparatus, generally noted as 10, having an anteriorly positioned rigid housing 12 and a flexible/elastic handle mechanism 14. The handle mechanism 14 is described in greater detail below.

As shown in FIG. 1, the housing 12 utilizes a form factor that has a lateral axis "W" that is greater than a vertical axis "H" and less than a linear axis "L". In yet another preferred embodiment the lateral axis "W" may be greater than three times the vertical axis "H". In yet another preferred embodiment the linear axis "L" may be greater than two times the lateral axis "W". The housing 12 has a generally smooth, flat upper housing surface 16 in which an ON/OFF switch 18 is generally centrally positioned. The housing 12 supports a set of three (3) illumination members 20 aligned about a housing leading edge 24. The illumination members 20 are anticipated as being light emitting diode (LED) types of lights. For the purpose of the present application a LED is a light-emitting diode: a semiconductor light source. LEDs are used as indicator lamps in many devices and are increasingly used for other lighting. Appearing as practical electronic components in 1962, early LEDs emitted low-intensity red light, but modern versions are available across the visible, ultraviolet, and infrared wavelengths, with very high brightness.

Along a pair of side edges 26 are formed a pair of grasping elements 30. Each grasping element 30 is formed as an angular, convex extension about each respective side edge 26. Each element 30 has leading edge 32 that is disposed at an obtuse angle relative to its respective side edge 26, and a trailing edge 34 that is perpendicular to or acutely disposed relative the leading edge 32.

Figure 2:
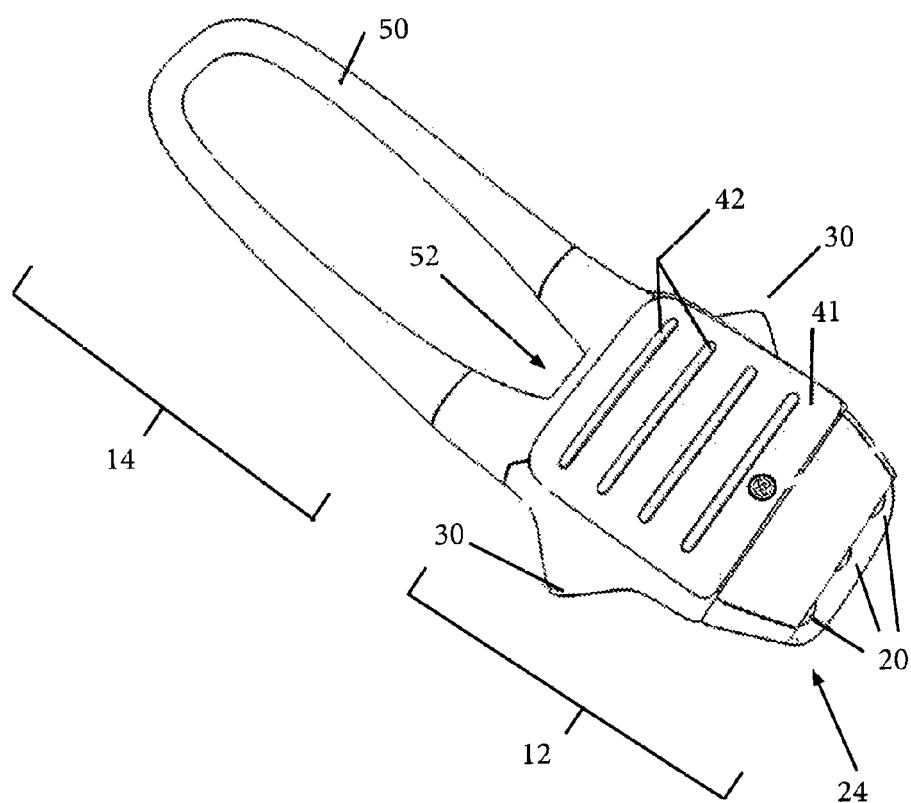
FIG. 2 is a lower perspective view thereof.

Referring now in conjunction with FIG. 2, a lower surface 40 of the housing 12 is shown in greater detail. The lower surface 40 may have an arch or slight concave shape. The lower surface 40 may further form a containment door 41 that sealingly covers a containment volume formed by the housing 12 in which batteries, control electronics and other operational elements are retained. The door 41 is removably sealed to the housing 12 and over the volume (not shown). The lower surface 40 may further form a plurality of laterally disposed gripping elements 42 to provide frictional impingement structures when placed in mechanical contact with an environmental structure or surface.

Further shown throughout the figures the handle 14 is shown. In greater detail, the handle 14 may be formed of a pliable, flexible or elastic length of band 50 of made of a stretchy durable plastic and secured at each end to a rear edge 52 of the housing 12. The rear edge 52 forms a concave structure or notch at the rear of the housing body. This notch structure is important such that the assembly 10 can be secured in place on a round, bar like surface such as generally provided for a handle 100 of a stroller (not shown).

It should become apparent to person having ordinary skill in the relevant art, in light of the present teachings, that the quick attach child's stroller lighting apparatus 10, while intended to be used in attachment with the horizontally disposed pushing handle of a child's stroller, such intended use, while the present invention is specifically adapted therefor, may not be a limiting use thereof, and that alternate uses may be within the general range of equivalents. By way of examples, and not meant as limitations, the size and form factor of the housing 12 as described herein is adaptable to being held efficiently within the palm of one's hand, with the handle 14 capable of being draped about the arm or wrist of the user. The handle 14 is further equally adaptable to securing on any other laterally disposed linear rail or bar, such as used in many types of outdoor power equipment such as mowers, snowblowers, and the like. While not the primary intention of the features provided herein, the benefits accorded the present invention may be adaptable to other similar ancillary uses, and as such these should not be considered limiting.

2. Operation of the Preferred Embodiment

Figure 3:
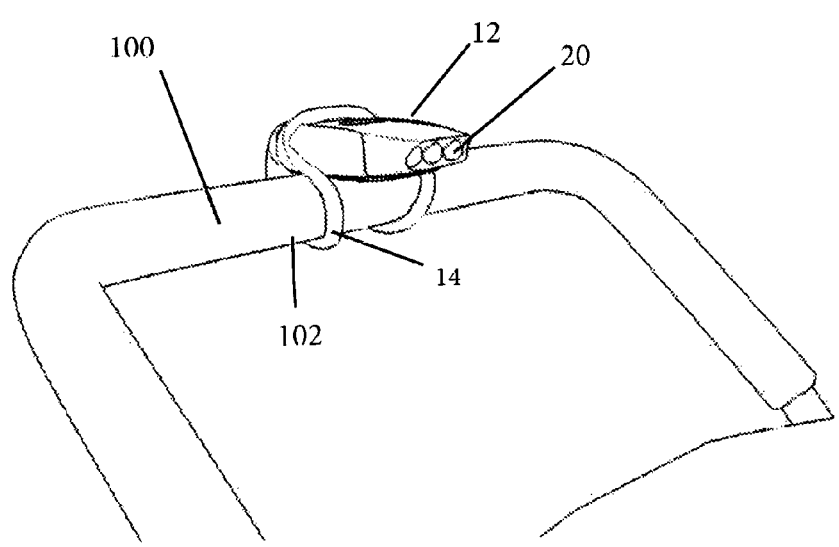
FIG. 3 is a perspective view thereof shown applied to an exemplary stroller grip handle.

Referring in conjunction with FIG. 3, to use the quick attach child's stroller lighting apparatus 10 in attachment with a stroller handle 100, the housing 12 is placed where it is wanted and the band handle 14 is stretched around the bar 102 and then around the housing 12 of the light 10. The gasping elements 30 further form an impingement structure for the band handle 14 in order to provide secure tension onto the housing 12 relative to the bar 102 and maintaining a secure placement. The holding grips 42 on the bottom side 41 of the housing 12 help to keep the apparatus 10 in place as well. The lights 20 are battery-powered (not shown) and has a slide-out door 41 on the bottom for replacing the batteries.

The on/off button 18 on the top surface is pushed to turn the lights on. Push the button a second time, and the lights may flash. It can be pushed a third time in order to turn the lights off. This light can be placed anywhere on the stroller, and the parents can add as many lights as they wish. The lights are available in a variety of fun and attractive colors, including blue, pink, purple, green, white and red.

The quick attach child's stroller lighting apparatus 10 may further have similar ancillary uses such as attachments to scooters and wheelchairs used by those who are handicapped. Teenagers may also attach it to their backpacks when skateboarding at night.

The presence of the directed, bright LED lights, which can be easily attached to a child's stroller, provide both the child and the parent with a great degree of visible when walking at night or in low light conditions. Being able to be attached and detached in seconds, no tools are required for these alterations.

The present invention may be an important safety feature which can be attached to a child's stroller, to increase visibility when walking at night. Drivers will see these bright LED lights from miles away. It is very small and compact, and the head contains three LED lights. At the back of the head is an elasticized circular band (a never-ending circle) that is used to attach the light anywhere on the stroller.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

What is claimed is:

1. A child's stroller lighting apparatus comprising:
    an anteriorly positioned rigid housing having and circumscribed by an upper surface opposite a lower surface and bounded by a leading edge opposite a rear edge and first side edge opposite a second side edge;
    a flexible handle mechanism connected to said rear edge wherein said flexible handle is further formed of a pliable, flexible or elastic length of band made of a stretchy durable plastic and secured at each end to said rear edge of said housing;
    a pair of grasping elements, said grasping element formed as an angular, convex extension about said first side edge and second side edge, respectively, wherein each grasping element comprises a leading edge disposed at an obtuse angle relative to its respective side edge, wherein further each grasping element further comprises a trailing edge that is perpendicular to or acutely disposed relative to said leading edge; and
    a plurality of illumination members aligned about said leading edge;
    wherein said flexible handle mechanism is further adapted to wrap around a stroller handle and impinge along said grasping elements such as to secure said housing in a desired position and orientation.

2. The lighting apparatus of claim 1, wherein said housing further comprises a lateral axis "W" that is greater than a vertical axis "H" and less than a linear axis "L".

3. The lighting apparatus of claim 2, wherein a lateral axis "W" is greater than three times a vertical axis "H".

4. The lighting apparatus of claim 2, wherein a linear axis "L" is greater than two times a lateral axis "W".

5. The lighting apparatus of claim 3, wherein a linear axis "L" is greater than two times said lateral axis "W".

6. The lighting apparatus of claim 1, wherein said housing further comprises a flat upper housing surface in which an ON/OFF switch is positioned.

7. The lighting apparatus of claim 1, wherein said illumination members comprise light emitting diode (LED) types of lights.

8. The lighting apparatus of claim 1, wherein said lower surface is formed of an arch or slightly concave shape.

9. The lighting apparatus of claim 1, wherein said lower surface comprises a containment door that sealingly covers a containment volume formed by said housing.

10. The lighting apparatus of claim 1, wherein said lower surface further forms a plurality of laterally disposed gripping elements for providing frictional impingement structures.

11. The lighting apparatus of claim 1, wherein said flexible handle is further formed of a pliable, flexible or elastic length of band made of a stretchy durable plastic and secured at each end to said rear edge of said housing.

12. The lighting apparatus of claim 11, wherein said rear edge further forms a concave structure or notch at the rear of the housing body.

13. The lighting apparatus of claim 11, further comprising an on/off button positioned on said upper surface.

14. The lighting apparatus of claim 13, wherein when said button is pushed a first time said illumination members turn on.

15. The lighting apparatus of claim 14, wherein when said button is pushed a second time said illumination members periodically flash.

16. The lighting apparatus of claim 15, wherein when said button is pushed a third time said illumination members turn off.

17. A method of illuminating a stroller comprising the steps:
    a. Selecting at least one illuminating apparatus of claim 1;
    b. placing said lower surface against an elongated structure on a stroller;
    c. wrapping said handle about the elongated structure in a tight manner to secure said illuminating apparatus to said elongated structure.

\* \* \* \* \*